US006868159B2

(12) United States Patent
Leppek

(10) Patent No.: US 6,868,159 B2
(45) Date of Patent: Mar. 15, 2005

(54) 'VIRTUAL' ENCRYPTION SCHEME COMBINING DIFFERENT ENCRYPTION OPERATORS INTO COMPOUND-ENCRYPTION MECHANISM

(75) Inventor: James Leppek, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 523 days.

(21) Appl. No.: 09/827,386

(22) Filed: Apr. 5, 2001

(65) Prior Publication Data

US 2001/0017918 A1 Aug. 30, 2001

Related U.S. Application Data

(63) Continuation of application No. 09/289,213, filed on Apr. 9, 1999, now Pat. No. 6,233,338, which is a continuation of application No. 08/691,838, filed on Aug. 1, 1996, now Pat. No. 5,933,501.

(51) Int. Cl.[7] .............................................. H04L 9/32
(52) U.S. Cl. ......................................... 380/28; 380/37
(58) Field of Search ..................................... 380/28, 37

(56) References Cited

U.S. PATENT DOCUMENTS

| 4,531,020 A | 7/1985 | Wechselberger et al. . | 176/22.08 |
|---|---|---|---|
| 4,802,217 A | 1/1989 | Michener | 380/29 |
| 5,317,638 A | 5/1994 | Kao et al. | 380/29 |
| 5,412,730 A | 5/1995 | Jones | 380/46 |
| 5,442,705 A | 8/1995 | Miyano | 380/29 |
| 5,450,493 A | 9/1995 | Maher | 380/30 |
| 5,513,260 A | 4/1996 | Ryan | 380/3 |
| 5,548,648 A | * 8/1996 | Yorke-Smith | 380/49 |
| 5,586,186 A | 12/1996 | Yuval et al. | 380/30 |
| 5,600,726 A | * 2/1997 | Morgan et al. | 713/164 |
| 5,606,616 A | 2/1997 | Sprunk et al. | 380/29 |
| 5,696,826 A | 12/1997 | Gao | 380/28 |
| 5,745,577 A | 4/1998 | Leech | 380/28 |
| 5,933,501 A | 8/1999 | Leppek | 380/21 |

OTHER PUBLICATIONS

Douglas Sttinson, Cryptography Theory and Practice, 1995.*

Spencer and Tavares, "A Layered Broadcast Cryptographic System," Department of Electrical Engineering, Queen's University, Kingston, Ontario, Canada, 1983, pp. 157–170.

* cited by examiner

Primary Examiner—Kim Vu
Assistant Examiner—James Seal
(74) Attorney, Agent, or Firm—Allen, Dyer, Doppelt, Milbrath & Gilchrist, P.A.

(57) ABSTRACT

A method controllably encrypts data to be transmitted over a communication path between a data source and data receipt by passing data to be transported over the communication path through a first of respectively different encryption operators to produce a first encrypted data stream. This is then passed through a second selected one of respectively different data encryption operators to produce a compound encrypted output data stream that is an encryption of the first encrypted data stream.

11 Claims, 3 Drawing Sheets

'VIRTUAL' ENCRYPTION SCHEME COMBINING DIFFERENT ENCRYPTION OPERATORS INTO COMPOUND-ENCRYPTION MECHANISM

This application is a continuation of Ser. No. 09/289,213 filed on Apr. 9, 1999 now U.S. Pat. No. 6,233,338, which is a continuation of Ser. No. 08/691,838, filed Aug. 1, 1996, now U.S. Pat. No. 5,933,501, issued Aug. 3, 1999.

FIELD OF THE INVENTION

The present invention relates in general to data processing and communication systems, and is particularly directed to a data communication access control mechanism for enabling a computer end user to securely encrypt data communications in such a manner that effectively prevents a usurper from decrypting the data.

BACKGROUND OF THE INVENTION

The rapid expansion of the data communications industry, in particular the Internet and the World Wide Web (WWW), sometimes referred to as the superinformation highway, has provided data processing system users with what is effectively global communication link interconnecting a vast number of databases and other network users. The local link between the network and the user is typically by way of a phone line (e.g., analog or ISDN, for example) of a public communication service provider, with the workstation hardware including a modem or terminal adapter equipment that allows dial-up access between the user and a remote party. Since a user's workstation is coupled directly to such interface equipment, not only can the workstation user access any other party having similar network access, but any other party can call the user's workstation.

More particularly, as diagrammatically illustrated in FIG. 1, a user workstation 10 may typically be coupled via a communication link 11 to a local area network (LAN) 20 by way of a LAN interface 13, which also provides access to an external, public communication services (PCS) network, such as the Internet 30. LAN 20 customarily includes one or more computer-based units, such as the illustrated workstations 21 and 22, network server 23 and printer 24, which are interconnected via a hub 25. The hub 25 is connected to interface 13, so that the end user workstation 10 may access any unit of the local area network 20. Similarly, to connect to the external network 30, the network interface 13 may be coupled through an electronic mail gateway 32 and a modem 33, so that a dial-up connection may be provided to an Internet connection provider 34, through which direct access to the Internet 35 is achieved.

Because a public communication system is a potential window into any computer linked to it, it is customary to both wrap or embed all communications in a 'security blanket' (some form of encryption) at the source end, and to employ one or more permission code (password) layers that must be used to gain access to another computer. Unfortunately, a fundamental characteristic of essentially all encryption operators or algorithms is the fact that, given enough resources, almost any encryption algorithm can be broken. This, coupled with the fact that each encryption algorithm has a 'footprint', which is discernible in the scrambled data by a sophisticated data communications analyst, means that no data communication can be guaranteed as secure.

SUMMARY OF THE INVENTION

In accordance with the present invention, this problem is effectively remedied by a 'virtual' encryption scheme that combines selected ones of plurality of different encryption operators stored in an encryption operator database into a compound sequence of encryption operators. Data to be transported from a data source site, such as a user workstation, to a destination or data recipient site, is sequentially encrypted by performing a compound sequential data flow through this sequence prior to transmission.

By 'virtual' encryption scheme is meant that the overall encryption operator itself does not actually perform any encrypting of the data. Instead, it assembles selected ones of a plurality of true encryption mechanisms into a cascaded sequence of successively different encryption operators, each of which operates on the data, to realize a scrambled data stream that is not practically decryptable by a sophisticated data communications usurper.

For this purpose, a plurality of respectively different data encryption operators are stored in an encryption algorithm database, with each operator having an associated access address code through which the operator may be readily called up or accessed to operate on a data sequence of interest. The fundamental mechanism of the virtual encryption scheme of the invention involves the generation of a sequence of the access codes, with immediately successive ones of the access codes of the sequence being different from one another.

This access code sequence is employed to call up or read out from the database selected ones of the respectively different data encryption operators so as to produce or assemble a sequence of data encryption operators. Because immediately successive ones of the access codes of the access code sequence are different from one another, then their associated data encryption operators that have been assembled into the sequence of data encryption operators are also successively different from one another. When the data is applied to the generated sequence of individual encrypting operators, what results is a scrambled data stream having no readily discernible encryption footprint that would imply what encryption mechanism has been used and facilitate decryption by a sophisticated data communications usurper.

Since it is 'virtual', the success of the encryption operator assembly mechanism of the invention does not rely upon the sophistication or complexity of any given encryption operator within its database. As a consequence, even conventional encryption operators may be used. The key to the success of the present invention is the fact that the data stream is wrapped or encrypted multiple times prior to transmission, with each successive wrap of the data presenting an encryptor that is different from the previous operator in the sequence.

In its simplest form, the virtual encryption scheme of the invention may comprise as few as two or three respectively different encryption operators. The order of the encryptors within the sequence to which the data is applied may vary as desired, and the sequence may 'toggle' or switch back and forth between the same set of encryption operators as part of its overall encryptor flow.

Because the encryption process of the invention subjects the data to successively different encryption operators, the final output of the sequence will be a compound-encrypted data stream that has no readily discernible encryption footprint. As a consequence, even if a skilled data communications usurper were to possess a decryption key for each of the encryption operators of which the compound encrypted data stream is comprised, there is a very low likelihood that he would be able to recognize the characteristics of any individual encryption operator. Moreover, without knowledge of the sequence of encryption operators through which the data has been encrypted, a usurper will be forced to operate under a severe resource penalty that makes decryption of such a compound sequence a practical impossibility.

At the recipient end of the data communications path, the recovery process involves the use of a complementary virtual decryption scheme that is the exact reverse of that used at the data source site. Namely, at the recipient site the received scrambled data stream is subjected to a 'virtual' decryptor, which sequentially 'unwraps' using a decryption key known to the recipient as being the complement of the encrypting sequence, thereby recovering the original data.

DETAILED DESCRIPTION

Figure 1:
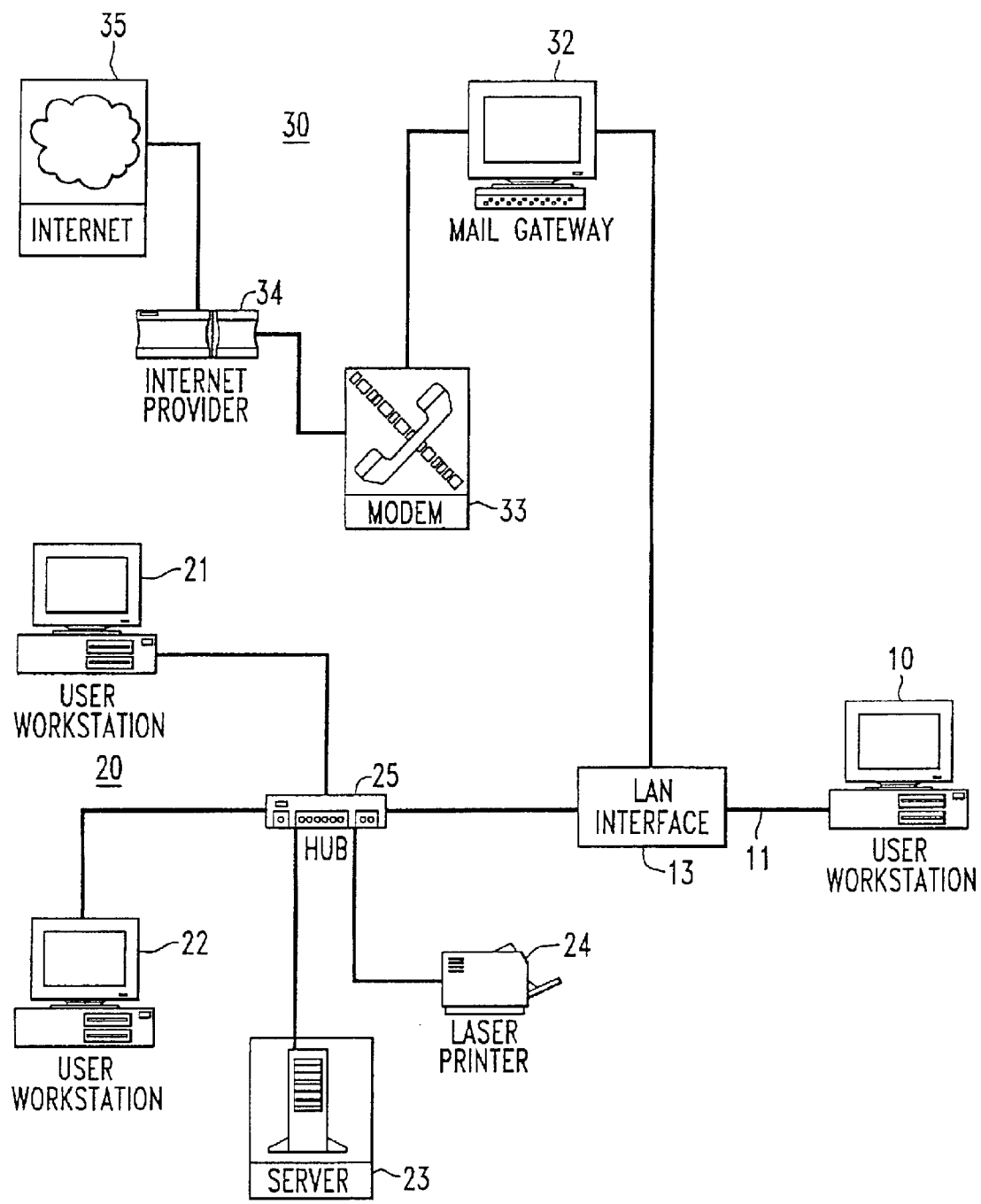
FIG. 1 diagrammatically illustrates a user workstation coupled to a local area network by way of a local area network interface, which also provides access to an external network.

Before describing in detail the improved data encryption mechanism in accordance with the present invention, it should be observed that the present invention resides primarily in what is effectively a prescribed set of communication encryption and decryption software employed by digital data terminal and communication equipment, that effectively enables end users of a data communications link to conduct secure data communications therebetween without the practical possibility of successful recovery in an intercepted encrypted data.

Consequently, the configuration of data terminal and communications units and the manner in which they are interfaced with other communication equipment of a conventional (public service) communications network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

As described briefly above, the data processing scheme of the present invention is effectively a 'virtual' encryption and decryption scheme, as it does not actually perform any encrypting of the data, but rather assembles selected ones of a plurality of true encryption mechanisms into a cascaded sequence of successively different encryption operators. It is the individual operators of the assembly that operate on the data. Data that has been sequentially encrypted by the individual encrypting operators of the virtual encryption scheme of the present invention is thus scrambled such that is not practically decryptable by a sophisticated data communications usurper.

Thus it is to be understood that the term encryption is not to be confused with other types of 'interior' or 'preliminary' data processing operations, such as code conversion, compression, the generation of a forward error correcting checksum sequence that is appended to the data, or other types of signal processing mechanisms that are intended to improve signal-to-noise ratio (reduce bit error rate), or improve channel bandwidth occupancy. Encryption in the context of the present invention is an 'exterior' data flow operation to which an entire data stream, that has already been subjected to the above discussed 'interior' data processing operations, is applied so as to scramble and thereby render unintelligible the ultimate data format that results from such preliminary data processing operations.

Figure 2:
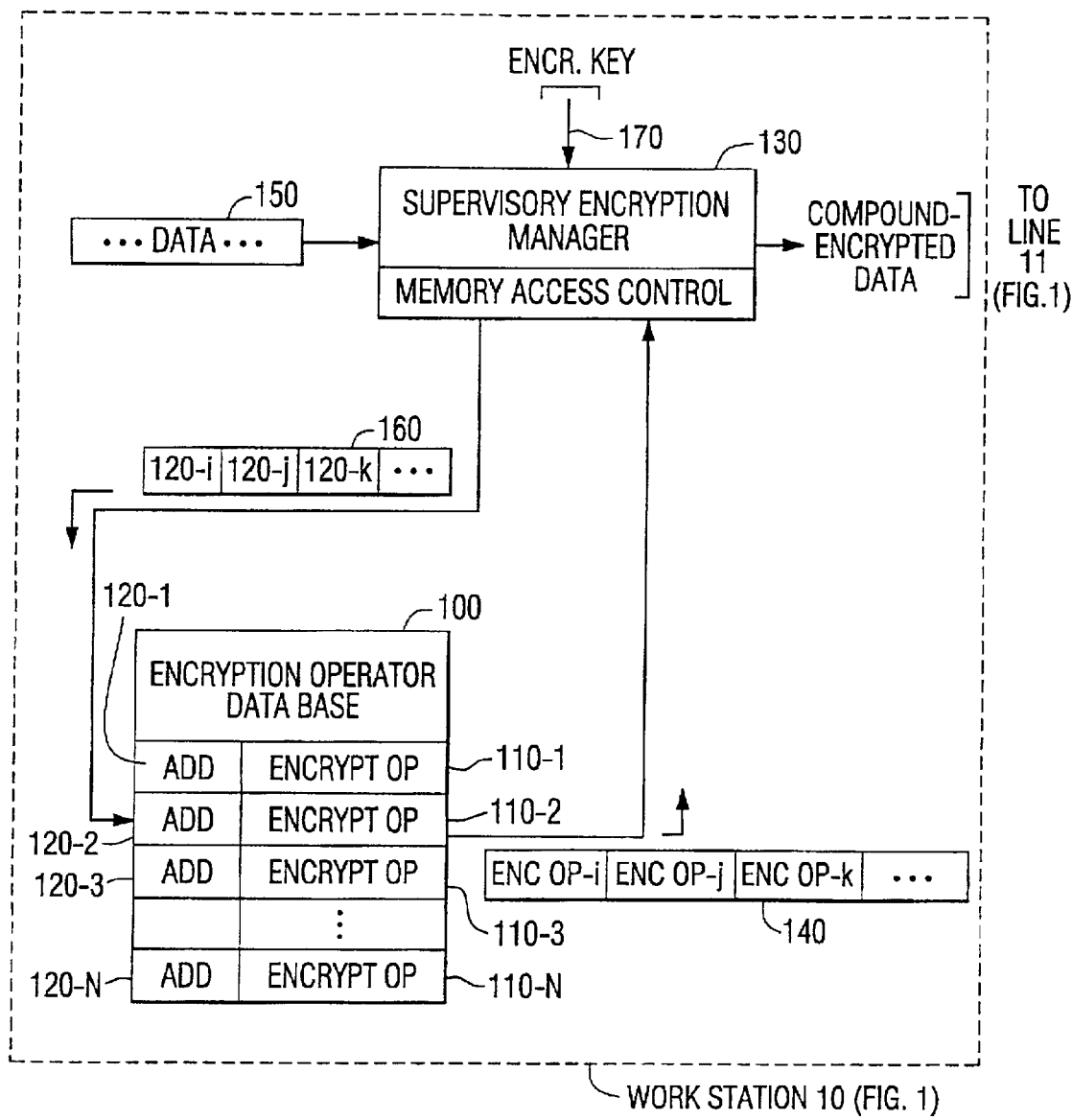
FIG. 2 diagrammatically illustrates a virtual encryption mechanism of the present invention.

Referring now to FIG. 2, the encryption portion of the virtual encryption and decryption mechanism of the present invention is diagrammatically illustrated as comprising a database 100, as may be resident in a user workstation, such as the workstation 10 in the system illustrated in FIG. 1, the database 100 containing a plurality of respectively different data encryption routine or operator entries 110-1, 100-2, 100-3, . . . , 100-N. The encryption routines 110, in and of themselves, need not be any particular type of encryption algorithm and may be conventional encryption operators, such as, PGP, DES, etc. routines, as non-limiting examples. Each encryption operator 110-i has an associated access address code 120-i, that is used by a memory access controller of a supervisory encryption assembly manager 130 to call up or retrieve a respective encryption operator 120-i in the course of generating an encryption operator sequence 140 that operates on a data stream 150 to be transmitted.

As described briefly above, the fundamental control factor used by the virtual encryption scheme of the invention is the fact it produces a sequence 160 of access address codes 120-i, such that immediately successive codes 120-i and 120-j in the assembled code sequence are different from one another. Thus, for an arbitrary plurality N of respectively different data encryption routine or operator entries 110-1, 100-2, 100-3, . . . , 100-N, there will be N associated access address codes 120-1, 120-2, 120-3, . . . , 120-N.

In accordance with the invention the supervisory encryption assembly manager 130 is supplied with an encryption driver or key 170 comprised of a sequence of M access code entries made up of K (at least two and up to all N) address code entries 120 for the encryption operators 110 stored in the database 100. M may be any number equal to or greater than two. Thus, at a minimum, address code sequence 140 would be defined by only two respectively different ones 120-i and 120-j of the N available codes, so that M would be equal to two, regardless of N. Even if N is only two, M is still unbounded, since it may comprise an alternating sequence of arbitrary length. Namely, where N=2, the database 100 would have only two entries 120-1 and 120-2. In this case, an encryption control access code sequence of length M could be generated as the alternating sequence . . . , 120-1, 120-2, 120-1, 120-2, 120-1, 120-2, 120-1, 120-2, . . . , up to M entries, where M>2. What is important is that the respective codes of any successive pair of codes differ from one another.

Given this successively different address code sequence 140, to encrypt the data stream 150, the supervisory encryption assembly manager 130 initiates the encryption process by calling up the first operator entry 110 associated with the first code 120 of the sequence 140 and applies the data 150 to that first encryption operator entry, so as to 'wrap' the data with that encryption operator. The supervisory encryption then calls up the second operator entry 110 associated with the second code 120 of the sequence 140 and applies the initially wrapped data to the second first encryption operator entry, so as to 'wrap' the previously encrypted data with the next encryption operator. This successive process of accessing sequentially differing encryption operators and wrapping the previously encrypted data continues until the last access code in the encryption control sequence 140 is processed. The compound-encrypted data is then transmitted over communication path, such as the communication link 11 of the network of FIG. 1, to a local area network (LAN) 20 by way of a LAN interface 13, which also provides access to an external, public communication services (PCS) network, such as the Internet 30.

To provide non-limiting illustration, let it be assumed that the encryption operator database 100 contains only three respectively different encryption operator entries 110A, 110B and 110C. As described above, an encryption operator sequence may be assembled using each of the three operators as participants that are permuted into an arbitrary sequence, the length and composition of which is open ended. In the present example, it will be assumed that a total of five encryptions will be performed, using the five operator sequence: 110A-110B-110C-110A-110C. Thus, the encryption driver or control key 170 supplied to the supervisory encryption assembly manager 130 will be comprised of the (M=5) code sequence: 120A-120B-120C-120A-120C.

In accordance with this non-limiting example, as the supervisory encryption assembly manager 130 processes this sequence, it will initially access the first encryption operator 110A associated with the first code 120A and cause the data 150 to be processed by the encrypting data flow operation embedded in the encryption operator 110A, producing a first 'A-encrypted' data stream. The supervisory encryption assembly manager 130 will next access the second encryption operator 110B associated with the second code 120B in the five code sequence 140 and cause the A-encrypted data to be processed by the encrypting data flow operation embedded in the second encryption operator 110B, producing a second, compound encryption of the original data stream as a B-encryption of the A-encrypted data.

Next, supervisory encryption assembly manager 130 accesses the third encryption operator 110C associated with the third code 120C in the five code sequence 140 and encrypts the B-encrypted, A-encrypted data producing a further compounded encryption of the original data 150 as a C-encryption of the B-encrypted, A-encrypted data. The C-encrypted, B-encrypted, A-encrypted data stream is next encrypted in accordance with the fourth operator 110A for the five code sequence 140, which is once again the A-encryption operator, as defined by the fourth access code 120A, producing a more complex A-encryption of the C-encrypted, B-encrypted, A-encrypted data. Finally, the A-encrypted, C-encrypted, B-encrypted, A-encrypted data stream resulting from the first four, sequentially different encryption operators is encrypted in accordance with the fifth and last operator 120C associated with the five code sequence 140, producing a C-encryption of the A-encrypted, C-encrypted, B-encrypted, A-encrypted data, as an extremely complex encryption of the original data.

From the foregoing, it will be readily appreciated that subjecting the data to successively different encryption operators will produce a compound-encrypted data stream having no readily discernible encryption footprint. Therefore, even if a skilled data communications usurper is in possession of a decryption key for each of the encryption operators A, B and C of which the five member compound encrypted data stream of the present example is comprised, there is a very low likelihood that he would be able to recognize the characteristics of any individual encryption operator in the transmitted data stream. In addition, without knowledge of the composition and entry order of the sequence of encryption operators through which the data has been encrypted by the supervisory encryption assembly manager, a potential data communications interceptor will be forced to operate under such a severe resource penalty that decryption of such a compound encryption sequence is practically impossible.

Figure 3:
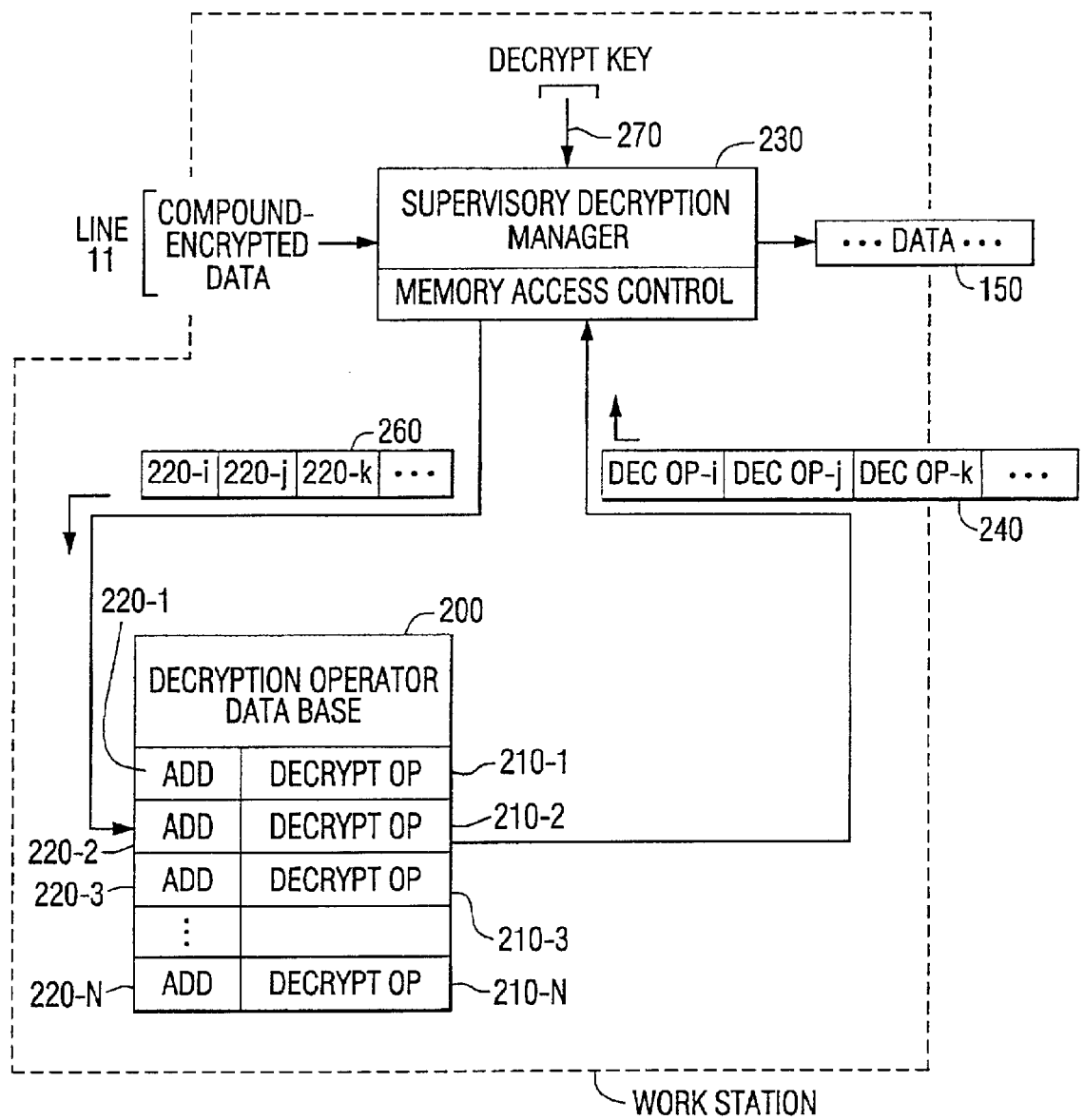
FIG. 3 diagrammatically illustrates a virtual decryption mechanism of the present invention.

As described briefly above, at the recipient end of the data communications path, the recovery process involves the use of a complementary virtual decryption scheme that is the exact reverse of that used at the data source site. Thus, as shown in FIG. 3, for the foregoing example, at the recipient site, a supervisory decryption disassembly manager 230 processes the received scrambled data stream using a 'virtual' decryptor, which 'unwraps' using a decryption code key 270 known to the recipient as being the reverse or complement of the encryption-control access code sequence 140 at the source site.

In accordance with the encryption operator sequence 110A-110B-110C-110A-110C of the present example, to decrypt the received data stream the supervisory decryption disassembly manager 230 will execute a reverse decryption sequence 240 comprised of the decryption operators having the order C-A-C-B-A. For this purpose, using a decryption operator access code sequence 260, the memory access controller of the supervisory decryption manager 230 will generate a sequence of addresses 220 that sequentially call up a set of reverse ordered decryption operators 210C-210A-210C-210B-210A stored in a decryption operator database 200. For the present example, it will initially generate an access code 220C associated with a first decryption operator 210C of the set of decryption routines 210 stored in database 200. This first accessed decryption operator 210C causes the received compound-encrypted data stream to be processed by the decrypting data flow operation embedded in the decryption operator 210C, thereby producing a first 'C-decrypted' or partially 'unwrapped' data stream.

Next, the second decryption operator 210A associated with the second code 220A in the five code decryption code sequence 260 causes the partially unwrapped, but still multiply encrypted data stream to be processed by the decrypting data flow operation embedded in the second decryption operator 210A, producing a second decryption or unwrapping of the received data stream. This decryption process is iteratively repeated, stepping through the remaining decryption operators 210C, 210B and 210A of the five operator decryption sequence: 210C-210A-210C-210B-210A, so as to completely unwrap the received data stream, leaving the original data, plus whatever 'interior' or 'preliminary' data processing was imparted to the data at the source site, and requires further processing, separate and distinct from the decryption of the present invention.

As will be appreciated from the foregoing description, by combining selected ones of a plurality of true encryption mechanisms into a cascaded sequence of successively different encryption operators, the virtual encryption mechanism of the present invention is able to produce a scrambled data stream that is not practically decryptable by a sophisticated data communications interceptor, thereby effectively circumventing the inability of conventional data encryption schemes to provide a practical guarantee of security for data communications, While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A method for controllably encrypting data to be transmitted over a communication path between a data source and a data recipient, comprising the steps of:

(a) providing at least three sequentially different data encryption operators to encrypt said data into an unintelligible form for transmission over said communication path;

(b) passing said data to be transported over said communication path through a first of said sequentially different encryption operators that are arranged in a cascaded sequence to thereby produce a first encrypted data stream; and (c) successively passing said first encrypted data stream through the cascaded sequence of said sequentially different data encryption operators and successively accessing the at least three different sequentially different encryption operators and successively wrapping previously encrypted data with the next respective encryption operator until the last access code in an encryption control sequence is processed to thereby produce a multiple-encrypted output data stream that is an encryption of said first encrypted data stream.

2. A method according to claim 1, further including the steps of:

(d) transporting said compound encrypted output data stream over said communication path to said data recipient; and (e) passing said output data stream through a sequence of second and first decryption operators that respectively decrypt data that has been encrypted by said second and first encryption operators, so as to recover said data.

3. A method according to claim 1, wherein step (a) comprises storing said plurality of respectively different data encryption operators in an encryption operator database, and wherein step (b) comprises retrieving said first encryption operator from said database and passing said data to be transported over said communication path through said retrieved first encryption operator to thereby produce a first encrypted data stream, and step (c) comprises retrieving said second encryption operator from said database and passing said first encrypted data stream through said second encryption operator to thereby produce said compound encrypted output data stream.

4. A method according to claim 1, further including the steps of:

(d) transporting said compound encrypted output data stream over said communication path to said data recipient; and (e) passing said compound output data stream through a sequence of second and first decryption operators that respectively decrypt data that has been encrypted by said second and first encryption operators, so as to recover said data.

5. A method according to claim 4, wherein step (e) comprises storing a plurality of respectively different data decryption operators in a decryption operator database, retrieving from said decryption operator database second and first decryption operators that respectively decrypt data that has been encrypted by said second and first encryption operators, and passing said compound output data stream through a sequence of said second and first decryption operators so as to successively decrypt said compound output data stream and thereby recover said data.

6. A method for controllably encrypting data to be transmitted over a communication path between a data source and a data recipient, comprising the steps of:

(a) providing at least three sequentially different data encryption operators;

(b) successively passing data to be transported over said communication path through a cascaded sequence of said sequentially different data encryption operators and successively accessing the at least three different sequentially different encryption operators and successively wrapping previously encrypted data with the next respective encryption operator until the last access code in an encryption control sequence is processed to thereby produce a multiple-encrypted data stream.

7. A method according to claim 6, further including the steps of:

(c) transporting said compound-encrypted data stream over said communication path to said data recipient; and (d) passing said compound-encrypted data stream through a sequence of multiple decryption operators that sequentially decrypt said compound-encrypted data so as to recover said data.

8. A method for controllably encrypting data to be transmitted over a communication path between a data source and a data recipient, comprising the steps of:

(a) storing at least three sequentially different data encryption operators in a data encryption operator database;

(b) retrieving from said database and assembling selected ones of said sequentially different data encryption operators into a cascaded sequence of data encryption operators, wherein immediately successive ones of said data encryption operations of said sequence are different from one another; and (c) successively passing data to be transported over said communication path through said cascaded sequence of data encryption operators generated in step (b), and successively accessing the at least three different sequentially different encryption operators and successively wrapping previously encrypted data with the next respective encryption operator until the last access code in an encryption control sequence is processed so as to produce a multiple-encrypted data stream.

9. A method according to claim 8, further including the steps of:

(d) transporting said compound-encrypted data stream over said communication path to said data recipient;

(e) retrieving from a decryption operator database in which a plurality of respectively different data decryption operators are stored, respective decryption operators that respectively decrypt data that has been encrypted by said selected encryption operators;

(f) passing said compound-encrypted output data stream through a sequence of decryption operators retrieved in step (e), successively decrypting said compound-encrypted data stream and thereby recover said data.

10. A method for controllably encrypting data to be transmitted over a communication path between a data source and a data recipient, comprising the steps of:

(a) providing at least three sequentially different data encryption operators;

(b) generating a cascaded sequence of data encryption operators comprised of plural ones of said sequentially different data encryption operators provided in step (a); and (c) successively passing data to be transported over said communication path through said cascaded sequence of data encryption operators generated in step (b), and successively accessing the at least three different sequentially different encryption operators and successively wrapping previously encrypted data with the next respective encryption operator until the last access code in an encryption control sequence is processed so as to produce a multiple-encrypted output data stream.

11. A method according to claim 10, further including the steps of:

(d) transporting said compound-encrypted output data stream over said communication path to said data recipient; and (e) passing said compound-encrypted output data stream through a sequence of decryption operators that respectively decrypt data that has been encrypted by said data encryption operators, so as to recover said data.

* * * * *